United States Patent [19]
Jaffray et al.

[11] Patent Number: 5,245,432
[45] Date of Patent: Sep. 14, 1993

[54] APPARATUS AND METHOD FOR TRANSFORMING A DIGITIZED SIGNAL OF AN IMAGE TO INCORPORATE AN AIRBRUSH EFFECT

[75] Inventors: Ian Jaffray, Toronto; John F. Bronskill, Scarborough, both of Canada

[73] Assignee: Imageware Research and Development Inc., Toronto, Canada

[21] Appl. No.: 787,208

[22] Filed: Nov. 4, 1991

Related U.S. Application Data

[62] Division of Ser. No. 387,049, Jul. 31, 1989.

[51] Int. Cl.$^5$ ............................................. H04N 5/262
[52] U.S. Cl. ...................................... 358/160; 358/22
[58] Field of Search ................. 358/160, 22, 181, 183

[56] References Cited

U.S. PATENT DOCUMENTS

| | | | |
|---|---|---|---|
| 4,800,430 | 1/1989 | Murakami et al. | 358/160 |
| 4,956,872 | 9/1990 | Kimura | 358/22 |
| 5,063,448 | 11/1991 | Jaffra et al. | 358/160 |

FOREIGN PATENT DOCUMENTS

| | | | |
|---|---|---|---|
| 0216536 | 4/1987 | European Pat. Off. | |
| 3620261 | 12/1987 | Fed. Rep. of Germany | |
| 0152380 | 11/1991 | Japan | 358/22 |
| 2170373 | 12/1985 | United Kingdom | |

OTHER PUBLICATIONS

Baxes; "Digital Image Processing" Prentice-Hall, Inc. 1984 pp. 129-172.
Edge Detection and the Laplacian Operator from [1], vol. 2.
Definition and Discussion of Morphological Edge Detectors from [2].
Thresholding Techniques from [1], vol. 2.
Definition of Opening, Closing from [2].
Definition of Erosion, Ditation from [2].
Contrast Modification from [1], vol. 1.
Contrast Modification Techniques from [3].
Median Filtering from [3].
Median and Rank Value Filtering from [1], vol. 1.
Mean Filtering from [1], vol. 1.
Definition of Convolution from [1], vol. 1.
Proceedings of the Seventeenth Annual Allerton Conference on Communication, Control, and Computing, 10-12 Oct. 1979, Allerton pp. 886-895, see the whole article.
1987 IEEE Int. symposium on Circuits and Systems, vol. 1 of 3, 4-7 May 1987, Philadelphia, Pa., IEEE, J.-H Lee et al.: "A fast algorithm for two-dimensional Wilcoxon filtering", pp. 268-271, see the introduction.

*Primary Examiner*—James J. Groody
*Assistant Examiner*—David E. Harvey
*Attorney, Agent, or Firm*—Bereskin & Parr

[57] ABSTRACT

The apparatus and method employ a variety of units, including Laplacian filters, rank value filters, edge detectors, gain units and summation units, to transform an input digitized signal of an image, the transformation being carried out for each pixel independently. The various elements are combined to produce a variety of desired visual effects, e.g. an airbrush effect. Further, an apparatus is provided in which a conditioning unit generates a conditioning function, which enables different parts of an image to be combined in accordance with different methods. Thus, a foreground of an image could have the edge content reinforced, whilst the background has brush stroke texture added.

4 Claims, 5 Drawing Sheets

APPARATUS AND METHOD FOR TRANSFORMING A DIGITIZED SIGNAL OF AN IMAGE TO INCORPORATE AN AIRBRUSH EFFECT

CROSS REFERENCE TO RELATED APPLICATION

This application is a division of application Ser. No. 07/387,049, filed Jul. 31, 1989.

FIELD OF THE INVENTION

This invention relates to both a method and an apparatus for transforming pictures or images. More particularly, it relates to a method or apparatus for effecting a transformation of a digitized signal of an image to achieve a painted appearance, including an airbrush effect.

BACKGROUND OF THE INVENTION

Both colour and black and white photography are in widespread use for both still and moving pictures. In the television field at least, numerous techniques have been used for manipulating a television picture in various ways, e.g. by adding or inserting a second image into a window in a first image. However, the basic picture itself remains essentially unchanged.

There is also a known technique of "posterisation", which essentially reduces the image to individual areas of solid, uniform colour, rather than progressive changes in colour.

If one wants to achieve a hand drawn or painted appearance, then the principal current way of achieve this is to simply have a skilled artist draw or paint his perception of the subject in a chosen style, using conventional instruments such as pen, pencil and paintbrush.

The use of an artist is acceptable in some circumstances, and indeed it is almost certain that a human artist can always add some effect or detail that can never be achieved by a machine. Nonetheless, for many subjects, the use of an artist is either prohibitively expensive or unnecessarily time consuming. In particular, if one wishes to add such an effect to a television signal, then one has the problem of applying the effect to every frame of the signal, where there are thirty frames per second. Clearly, for even a very short sequence, the amount of work involved would be prohibitive.

Accordingly, it is desirable to provide a technique which enables a conventional colour or black and white image to be processed to achieve a variety of effects, principally giving an image a hand-drawn or painted appearance. Other more specialized effects can be provided, for example, an image can be rendered so that it appears to be a three-dimensional chrome surface. Ideally, one requires a method and apparatus that enables a variety of different techniques to be selected, manipulated and combined with one another to achieve an almost infinite variety of effects. It is further desirable that such an effect should be capable of being applied relatively quickly and economically to a digitized television or motion picture signal, or a digitized still picture or photograph.

SUMMARY OF THE PRESENT INVENTION

The present invention provides an apparatus and method, capable of applying an air brush appearance to a digitized signal of an image.

Thus, in accordance with the present invention, there is provided an apparatus, for adding to a digitized signal of an image an airbrush effect, the apparatus comprising:

means for generating, for each pixel, first and second random numbers corresponding to the first and second coordinates for that pixel; and summation means for adding, for each pixel, two corresponding, random numbers to the two corresponding coordinates, to produce output coordinates, whereby the pixels of the original image are scattered randomly in an output image in dependence upon the random numbers generated.

The present invention also encompasses a system or apparatus for incorporating two or more effects into a digitized signal of an image. The apparatus further includes a conditioning unit for generating a conditioning signal, and also an image composition unit. The image composition unit receives the outputs from the selected apparatus and also the output from the conditioning unit. The composition unit then composes an output image by selective combination of the outputs of the various apparatus, in dependence upon the conditioning signal from the conditioning unit.

In a preferred aspect of the present invention, there are two selected effects or apparatus, selected from an airbrush effect, a brush stroke effect, and the effect of a reflective chrome surface.

The present invention also provides methods corresponding to the apparatus.

BRIEF DESCRIPTION OF THE DRAWINGS

For a better understanding of the present invention and to show more clearly how it may be carried into effect, reference will now be made, by way of example, to the accompanying drawings in which.

DESCRIPTION OF THE PREFERRED EMBODIMENTS

Before describing the individual techniques in detail, a description of individual elements or processes is provided. In the following discussion, the assumption is made that the image is a digital image. In the case of an image which is initially in analog form, this would need to be processed to digitize it. Further, for the digitized image, this is considered to comprise a number of pixels or individual points, which can be processed individually, as is known.

The notation used to identify the individual pixels in an image is to use an x-y coordinate system, x being the horizontal coordinate and y the vertical coordinate. Then, each pixel is denoted by $P(x,y)$, where x and y are the coordinates for that particular pixel. P denotes the intensity of the pixel. Clearly, for each pixel, in a colour image, there will be hue and saturation parameters as well.

There are a number of basic processes or transformations that can be applied to the image. Thus, two images can be subjected to the basic arithmetic functions of addition, subtraction, multiplication or division, this being done on a pixel by pixel basis; e.g. each pixel of one image is added, subtracted etc. to the corresponding pixel of the second image, to produce a corresponding pixel in the final or output image. For example, one can simply add two images together as, by the equation $P_3(x,y) = P_1(x,y) + P_2(x,y)$ for all x,y.

A further technique is to simply multiply the intensity of each pixel by a constant gain, denoted G. Again, this is presented by an equation:

$$P_2(x,y) = GP_1(x,y) \text{ for all } x, y.$$

One conventional use of applying a gain to the pixels is to compensate for an image which has a predominance of low intensity pixels, i.e. the image has an overall dark appearance. If one draws a histogram of the frequency of occurrence against intensity, one gains an impression of the overall impression of the picture. If all the pixels are clustered towards the left hand end of the scale, i.e. indicating uniformly low intensity, then one can apply a certain gain to all the pixels to expand the range of intensity or grade levels to cover the entire range. Similarly, an excessively bright image will show a histogram with all the pixels clustered towards the upper end of the grade level or intensity scale. This can simply be modified by applying a gain which is less than unity, to reduce the value of the intensity.

Image filtering is another standard technique which is employed by the present invention in combination with other standard techniques.

A mean filter or blur replaces the intensity of each pixel by an intensity derived by averaging or taking arithmetic mean value of the intensity of that pixel and its neighbours. This operation is repeated for each pixel in the image. The larger the area or number of pixels involved in the averaging process, the greater the blurring effect. This is sometimes referred to as a moving window average, since one is effectively looking at all the pixels within a certain window centred on a particular pixel.

By way of example, a 3×3 window blur would take the values of nine pixels in a square and then use this average value as the intensity for the centre pixel of that window.

For pixels at the edge of an image, as they are not totally surrounded by other pixels, allowance has to be made for this.

There is also known in the art a large variety of standard filters. These filters and other techniques mentioned above have conventionally been used to enhance pictures suffering from noise or distortion. Alternatively, in the field of robotics and industrial applications, image processing has been used with a view to aiding machine or automatic recognition of objects against a background.

In the present invention, rather than trying to eliminate distortion or noise, the inventors have realized that a variety of interesting and visually pleasing effects can be achieved by, in effect, deliberately introducing controlled distortion or noise. This gives a desired visual effect in the final image. The invention makes use of four different digital classes, namely: neighbourhood operations; point transformation operations; geometrical transformation; and colour space conversion.

A neighbourhood operation is the modification of pixel values in a digitized image based on the value of the pixel itself and the value of nearby pixels in a predefined neighbourhood or window. By performing a neighbourhood transformation on every pixel on an image, one can realize a number of different image filtering operations. Above, is given the example of simply taking the arithmetic mean to achieve a blurring effect. This is a particular example of a two-dimensional convolution (sometimes referred to as a finite impulse response filter), which simply replaces a pixel value under consideration with a weighted average of the pixel and its neighbours. The particular example given above took the same value for all the pixels in the window or neighbourhood, to give a low-pass filter which blurs the image. Different weights can be given to the pixels to achieve a high-pass filter which sharpens an image or a band-pass filter which enhances or suppresses certain details in an image.

It should be appreciated that, for a typical video resolution image, there are 500 rows and 500 columns of pixels, giving 250,000 pixels. To take a nine-point arithmetic means for each pixel and compute in 1/30 second, this being the time for each frame, is beyond the ability of current general purpose computers. In other words, it is not possible to carry this out in real time without special purpose apparatus.

An example of a Laplacian filter is given by equation:

$$P_2(x,y) = 4P_1(x,y) - P_1(x-1,y) - P_1(x+1,y) - P_1(x,y-1) - P_1(x,y+1) \text{ for all } x,y.$$

It will be seen that if all the pixels in the neighbourhood have an equal value, this results in a transformation giving a zero value. However, if an edge or high intensity image detail is located in the centre of the neighbourhood, the Laplacian operation will apply a high gain to this pixel value and emphasize this detail. The Laplacian filter overall has an effective image-sharpening or detail enhancement effect.

In the following description of preferred techniques, the designation "L" in a rectangle is used to denote a Laplacian filter.

Another neighbourhood operation that is commonly used is a rank value filter. All the pixels in the selected neighbourhood are ordered or ranked from smallest to largest in intensity. The centre pixel in the neighbourhood is then replaced with the pixel value that has a specified rank. A median rank filter replaces the centre pixel with the pixel value that represents the middle or median rank. A maximum filter replaces the centre pixel with the maximum value in the neighbourhood, and a minimum filter operates accordingly. The maximum and minimum rank filters fall into a special sub-class called morphological, which have powerful geometric properties. A maximum filter is often referred to as a dilation filter, as everything expands or swells; a minimum filter is often referred to as an erosion filter, as everything shrinks. These effects are incorporated into the methods of the present invention to achieve a variety of effects.

An interesting property of a median filter is that it removes or smooths details from the image that are smaller than the filter neighbourhood extend. It has been realized that this characteristic can be used to impart a brush-stroke impression onto an image by effectively flattening detail inside a neighbourhood. By choosing various neighbourhood sizes and shapes, various paintbrush sizes and shapes can be simulated.

In the following discussion of preferred techniques or methods, the designation "RVF" is used to denote a two-dimensional rank value filter.

Neighbourhood operations can also be used to implement edge detectors. An edge detector is one that outputs a high value when there is a sharp change in image intensity and outputs a low value in areas of constant intensity. The output of an edge detector or edge map is useful for emphasizing or de-emphasizing the edge content in an image. Various techniques have been used which depend upon edge maps derived from edge detection. In other words, the filter neighbourhood size and shape changes based on the edge magnitude and direction. This enables a variety of effects to be achieved, that are totally driven by the image content.

In the following description of preferred techniques, the designation "E" is used to indicate an edge magnitude detector.

It will be appreciated that for all these various filters and detectors, one can use a neighbourhood of a variety of sizes and shapes. The larger the neighbourhood, the more dramatic the change in the output image with respect to its input. However, the larger the neighbourhood, the greater the amount of computation that is required for each pixel. It is now possible to obtain ASICs (Application Specific Integrated Circuits) from several companies which will implement a convolution in real time with up to an 8×8 pixel neighbourhood.

The contrast stretch outlined above is an example of a point transformation, which involves mapping a single pixel value to another, independently of other pixel values. Another example of point operation is thresholding. Here, pixels that exceed a pre-defined intensity threshold are mapped to a particular value, and those that for below the threshold are mapped to another value. This operation can effectively be used to divide an image into two components, often to separate a foreground object from its background. The process can be generalized to multiple thresholds.

Such thresholds can be used to effect a pseudocolouring of the picture, which is carried out by assigning individual colours to pre-defined intensity ranges.

This point transformation operation can enhance perception of certain details in an image. Since point transformations amount to a simple re-mapping of a pixel value, they can be realized with a look-up table (LUT) operation. LUT processors operating n real time are available from several companies.

Another type of image transformation is one that re-maps the locations of pixels in an image. An example of this would be to rotate an image through a given angle. The present invention uses several novel geometrical image manipulations which are called perturbation effects, since location of a pixel is perturbed in some manner. By adding random noise to each pixel, one can achieve an airbrush or splatter paint effect, depending on the amplitude of noise added.

It has further been realized that, by using shape from shading theory, one can turn an image into a reflective or refractive surface. In effect this technique is used to model the image intensities as a three-dimensional surface.

A final category of image manipulation that is used by the present invention is colour space conversion. Most colour video images reside in the RGB (red, green, blue) colour space, due to the limitation of phosphor colours. However, colour image processing is most conveniently carried out in the HSI (hue, saturation, intensity) colour space where the colour of a pixel may be decoupled from its intensity. Thus, a contrast stretch operation may be performed on the intensity component only of an image without effecting the colour balance. Consequently, RGB to HSI and HSI to RGB conversions are commonly used in operations by the present invention. Further, one often requires a hard copy of an image that has been processed in the video domain. The accomplish this, one must convert the RGB video image to the CMYK (cyan, magenta, yellow, key) colour space, that corresponds to available inks in the printing industry. This is a non-trivial conversion if high quality results are required.

These effects can be achieved either in a software form or in real-time hardware. It is believed that at the present time there is hardware available that would enable circuit cards to be constructed incorporating image processing ASICS, to effect the methods of the present invention. These circuit cards would be controlled from various industry standard computer buses.

Reference will now be made to the Figures which show an example of the techniques and methods in accordance with the present invention.

In all these examples, where reference is made to specific kernel sizes, etc., this is to an image having a 512×512 pixel size.

Figure 1:
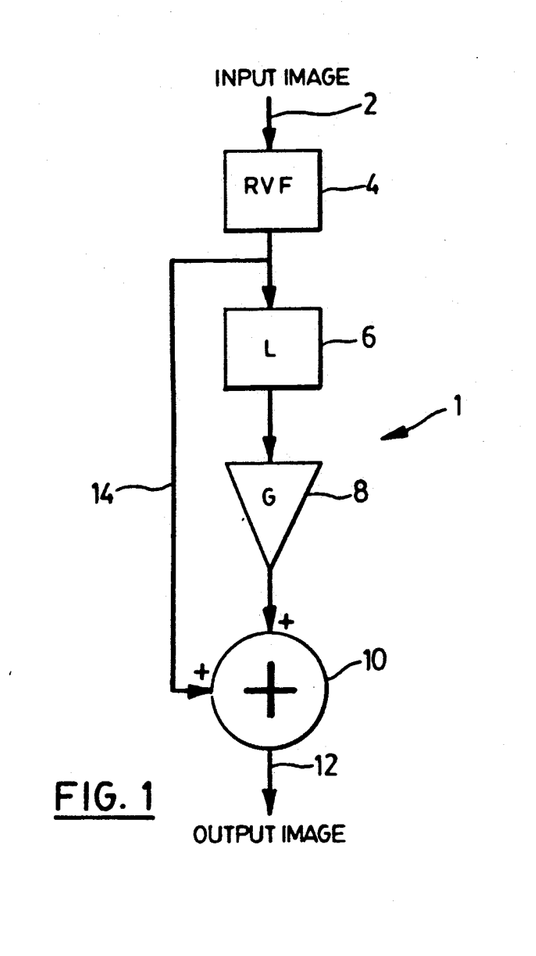
FIGS. 1-7 show schematically different apparatus in accordance with the present invention.

FIG. 1 shows an apparatus for effectively imparting a brush stroke texture to an image, the apparatus in FIG. 1 being generally denoted by the reference 1. The apparatus 1 includes an input 2 for the image, which is the input to a rank value filter 4.

The rank value filter 4 is in turn connected to a Laplacian filter 6 and then a variable gain unit 8. The gain unit 8 has its output connected through an addition unit 10 to an output 12. Another input of the addition unit 10 is taken directly from the output of the rank value filter 4 through a bypass line as indicated at 14.

In use, a kernel or window size and shape is selected for the rank value filter 4 and this determines the brush stroke size and shape. Thus, one can use a window that is elongate to achieve a brush stroke in a particular direction. The gain, G, set by the gain unit 8, sets the stroke boldness. If G is set to zero, the stroke will be muted. However as the gain G increases, the stroke prominence increases.

By way of example, the rank value filter 4 can have a square kernel with each dimension of the kernel varying from 1-15 pixels (with a median rank value). The gain unit 8 can provide a gain in the range 0-3. Zero gain gives a muted brush stroke, whereas a gain of 3 gives a bold brush stroke affect. The size of the kernel affects the brush stroke size and imparted. A more particularly preferred set of parameters would be a kernel size of 7 pixels square and a gain of 1.5.

For the rank value filter 4, a variety of kernel shapes could be used, for example square, rectangular, diagonal, cross and circular, depending upon the type of brush stroke required and the direction required for the brush stroke.

The rank value filter 4 removes or smooths details from the image that are smaller than the filter kernel extent, hence it is the kernel size that determines the effective brush stroke size. This local smoothing action tends to leave an imprint of the size and shape of the rank value filter kernel in the ares of the image where detail has been removed. If the kernel shape and size are chosen such that it is the shape and size of the desired brush stroke, the rank value filter output image will appear to have muted brush strokes imparted on it. A Laplacian filter is often employed to emphasize the image detail. Here, the Laplacian filter is employed to emphasize the boundaries of the imparted brush strokes, and depending upon the gain used, the brush stroke can range from muted to bold as the gain is increased.

Figure 2:
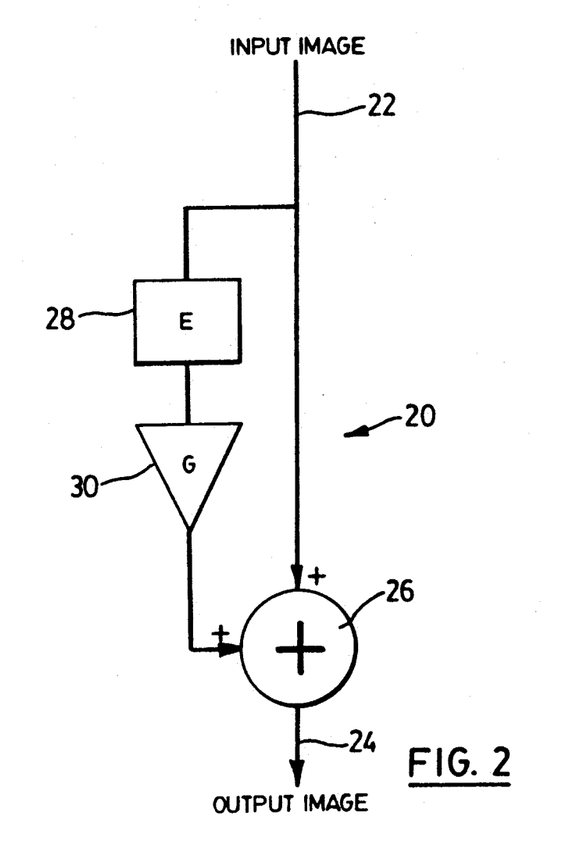

Referring now to FIG. 2, there is shown an apparatus generally indicated by the reference 20, which again has an input 22 and an output 24 which are connected through an addition or summation unit 26. The input 22 is additionally connected through an edge magnitude detector unit 28 and a variable gain unit 30, whose output is connected to another input of the addition unit 26.

Here, the gain unit 30 can be adjusted to provide either a positive or negative sign to the gain. The effect of the units 28, 30 is to add the detected edges to the output image. If a positive sign is set by the gain unit 30, then the edges will be outlined in white, whereas if the unit 30 provides a negative sign then the edges will be outlined in black. The intensity of the outlining depends upon the gain set by the unit 30.

By way of example, a preferred arrangement of this second apparatus would have an edge magnitude detecting unit 28 which is a morphological edge detector (as disclosed in J. Serra, "Image Analysis Mathematical Morphology", Academic Press, New York, 1983). This edge detector has a square kernel with each side of the kernel having from 1-5 pixels, more preferably 3 pixels. The gain unit 30 can have a gain that varies in the range of 1-5 and preferably a gain of 3.5. The size of the kernel and the edge detector is directly proportional to the edge thickness in the pixels.

Other edge detectors that could equally be used as the edge magnitude detector number 28 are the Sobel Edge Detector, the Compass Gradient Edge Detector, the Laplacian Edge Detector, the Roberts Edge Detector, the Kirsch Operator, the Difference of Gaussians Edge Detector. It should be noted that a variety of other image edge enhancement filters could be used.

The edge magnitude detector unit 28 creates an image in which each pixel in image is proportional to the magnitude of any intensity changes near that pixel. Thus, areas where intensity changes abruptly have a high output in the edge detection image, and areas with little change in intensity have a low output in the edge detection image. This method strengthens the edge content of an image by adding or subtracting edges that have first been multiplied by a variable gain factor to or from the original input image. Adding the gain multiplied edges tends to make regions of the input image with high edge content to appear white, while subtracting the gain multiplied edges makes those regions appear black. Thus, the overall effect of this technique is to make areas in the input image with a high edge content become outlined in white or black.

Figure 3:
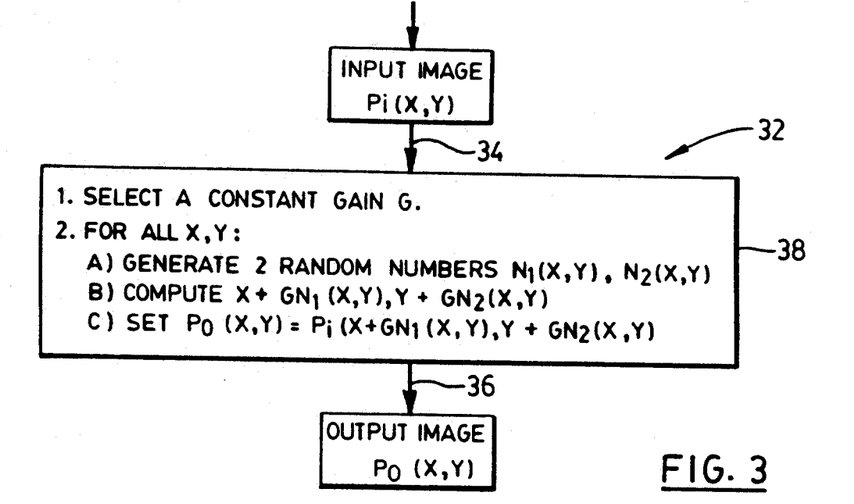

FIG. 3 shows an apparatus generally denoted by the reference 32 which includes an input 34 and an output 36, for the input image denoted by $P_i(x,y)$ and $P_o(x,y)$ respectively. The processing is indicated within the box 38. This is given by the following equation:

$$P_o(x,y) = P_i(x + Gn_1(x,y), y + Gn_2(x,y)), \text{ for all } x,y$$

Where:

$n_1(x,y)$ and $n_2(x,y)$ are random numbers generated for each input image pixel; and G is a constant gain value.

Effectively, for each pixel given by the coordinates x,y, one generates two random numbers $n_1(x,y)$ and $n_2(x,y)$. Each of these random numbers is multiplied by a gain factor G and then added to the respective coordinate x or y. Thus, each of the output coordinates for x and y is the same as the input coordinate, plus the random number multiplied by the preset gain.

The effect of this is to scatter the pixels across the image, the degree of displacement of the pixels from their original positions being dependent upon the gain set. This gives an air brush effect with variable coarseness, the degree of coarseness being determined by the gain set.

A preferred random numbered generator is one which produces random numbers with a uniform probability density function in the range from 0 to 1. This is then preferably combined with a gain of 2 to give a mild splattering dislocation of the pixels. A gain of, for example, 20 gives a very dislocated and hazy splattering of a pixel, while gains of greater than 20 tend to produce images that are unrecognizable.

Other probability density functions from a random numbered generator may be used with equal success. The texture of the dislocated pixels would change as the density function changes. For example, a normal probability density function with zero mean and unity variance could be used and the result would be a somewhat less coarse pixel dislocation for the same gain factor. Log-normal exponential, poisson and other probability density functions could also be used to give a good effect.

Figure 4:
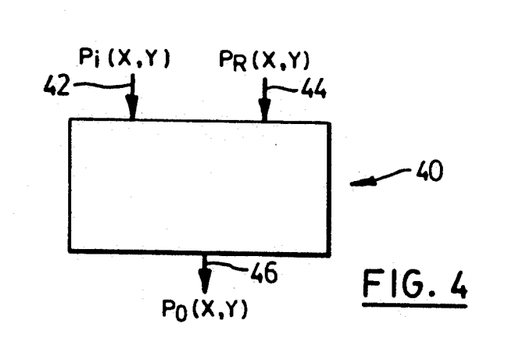

Turning to FIG. 4, there is shown an apparatus for providing a chrome surface effect. Here, the apparatus is generally denoted by the reference 40. Again, the apparatus is shown as a single unit having an input 42 for an image, $P_i$, to be processed and a second input 44 for an image, $P_R$, that is to be reflected into the output image. An output is indicated at 46. The equations indicating the processing occurring in the apparatus 40 are as follows:

$$P_o(x,y) = P_R(X_T, Y_T) \text{ for all } x,y$$

Where:

$$X_T = \begin{bmatrix} x; P_i(x,y) - P_i(x-a,y) = 0 \\ \frac{x_m}{\pi} \arctan\left(\frac{a}{P_i(x,y) - P_i(x-a,y)}\right); \text{otherwise} \end{bmatrix}$$

$$Y_T = \begin{bmatrix} y; P_i(x,y) - P_i(x,y-b) = 0 \\ \frac{y_m}{\pi} \arctan\left(\frac{b}{P_i(x,y) - P_i(x,y-b)}\right); \text{otherwise} \end{bmatrix}$$

Where: a, b are constants setting the surface smoothness, and where $x_m$ and $y_m$ represent the maximum extent of the digitized input images in the x and y directions respectively, i.e. the number of pixels in the two directions.

In effect, the process here is reflecting the image, $P_R$, in the input image, $P_i$, and thus is treating the input image as a reflective or mirrored surface. Further, the intensity of each pixel in the input image, $P_i$ is treated as the height above an arbitrary flat surface, so as to give a three dimensional effect, two dimensions being the x and y coordinates and the third dimension being the pixel intensity.

Thus the method starts by converting the input image, $P_i$, into a three dimensional surface. It then assumes that this is reflective and effectively takes the reflection of the image, $P_R$, in this reflective surface. In order to be able to "see" the shape of a complex reflective surface, one has to have some image that is reflected in it. It is for this reason that the image $P_R$ is provided. The image $P_R$ can be any suitable image, and can be selected to give a desired appearance.

It should be appreciated that if the input image, $P_i$ is simply a flat surface, i.e. a conventional plain mirror, then one would obtain a pure reflection of the image to be reflected, $P_R$. Where the input image $P_i$ is a complex shape, e.g. a person's head, then the reflective surface is extremely complex and, resulting in considerable distortion of the image to be reflected, $P_R$, so that this is often unrecognizable. Even if the reflected image $P_R$ becomes totally distorted and unrecognizable the output image still retains the shape or appearance of the input image $P_i$, but with a simulated, reflective or chrome finish.

The equations given above effectively intend to simulate, in a simplistic way, this process. These are discussed below for the x coordinate, it being appreciated that the y coordinate is calculated in an exactly corresponding manner.

For the x coordinate when the condition $P_i(x,y)$ minus $P_i(x-a,y)=0$, one has a flat reflective surface, at least locally. Hence, a point on the image to be reflected, $P_R$ is reflected back from the flat surface to exactly the same point. For this reason, $X_T$ is simply set equal to x. However, where this condition is not met, i.e. the surface is not locally flat, consequently, the local surface of the image $P_i$ will point to an alternate location on the image to be reflected $P_R$. The arctan function is simply a calculation as to the point in the image $P_R$ that the locally inclined surface of the image $P_i$ indicates.

It is appreciated that these calculations are optically simplistic, and do not take into account the complex effects one obtains from complex curved surfaces. Nonetheless, it has been found that the overall effect is to give a very effective simulation of a chrome surface, which produces a realistic three-dimensional effect, representive of the original input image $P_i$. The input image $P_i$ then appears to have been coated with reflective or chrome finish.

Whilst a variety of different constants can be used, it has been found that a useful range for the smoothing constants a,b is 1-15, with a value of 1 creating a reflective surface that is most sensitive to the undulating surfaced of $P_i$ and the value of 15 being much less sensitive than the local variations in $P_i$.

As an example of the image that can be used for the image to be reflected, $P_R$, one can choose a ramp image represented by the formula $P_R(x,y)=y$ for all x,y. This is a ramp which increases from zero at y=0 to a maximum value for the maximum value y. It will be appreciated that the ramp can be arranged to incline in any direction. In effect, the intensity of the image to be reflected, $P_R$, varies as the shape given by the ramp.

The result of using such an image for the image to be reflected, $P_R$, is to give a 3-D bas relief effect of the input image, $P_R$. This results because when $P_R$ is chosen as a uniformly changing ramp image, it varies from dark to light across its surface. This models a uniformly changing light source that is reflected into the reflective surface of the input image $P_i$, which tends to light the three dimensional surface model of the input image in a way that gives it a three dimensional relief image. In other words, the lighting gives depth as seen by a viewer.

Figure 5:
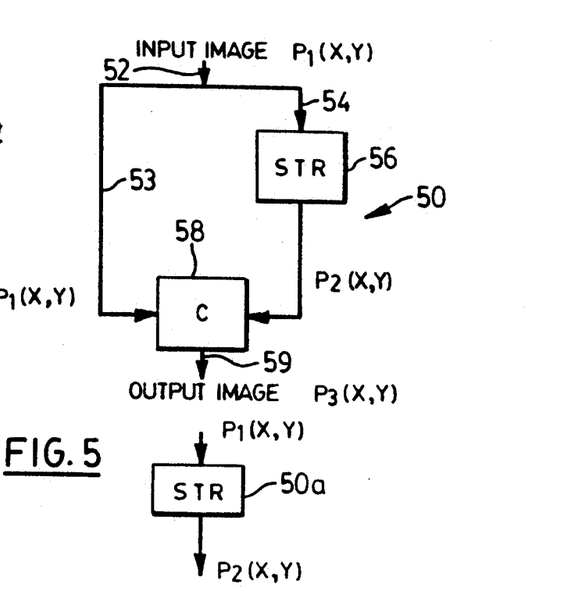

Referring now to FIG. 5, there is shown a fifth apparatus generally denoted by the reference 50. The apparatus 50 has an input 52 for an input image which is divided into two branches, one branch 53 connected directly to a combination unit 58 and another branch 54 connected to a contrast stretch unit 56. The output of the contrast stretch unit 56 is also connected to an input of the combination unit 58. The combination unit 58 has an output 59.

The unit 56 performs a contrast stretch operation which is given by the following equation:

$$P_2(x,y) = \begin{bmatrix} 0; p_1(x,y) < \text{INTENSITY 2} \\ \text{MAX-VAL}; P_1(x,y) > \text{INTENSITY}_1 \\ \text{MAX-VAL} \frac{(P_1(x,y) - \text{INTENSITY}_2)}{\text{INTENSITY}_1 - \text{INTENSITY}_2} ; \\ \text{otherwise} \end{bmatrix}$$

for all x,y.

and MAX-VAL is the maximum allowable pixel value in the input image; $\text{INTENSITY}_1$, $\text{INTENSITY}_2$ are selected image grey levels with $\text{INTENSITY}_1 > \text{INTENSITY}_2$.

The function given by the above equation essentially sets the output, $P_2(x,y)$, by three separate calculations, depending upon the value of the input signal, $P_1(x,y)$. If $P_1$ is less than $\text{INTENSITY}_2$, then the output $P_2$ is set to zero. If $P_1$ is between $\text{INTENSITY}_2$ and $\text{INTENSITY}_1$, then $P_2$ is determined by the equation above which essentially gives a straight line slope from zero to the maximum value as $P_1$ increases from $\text{INTENSITY}_2$ to $\text{INTENSITY}_1$. Where $P_1$ is greater than $\text{INTENSITY}_1$, then the output is set to the maximum value.

The effect of this is to stretch a middle range of grey levels, and eliminate the upper and lower grey levels from the input signal by setting them to zero or the maximum value respectively. If one considered a histogram of the distribution of the pixel intensities against the grey level or intensity, one would find that the middle portion of the histogram had effectively been taken and stretched to cover the whole scale, whilst the outer portions of the original histogram had effectively moved to the very edges.

The combining function performed by the combination unit 58 can be given by either one of the following equations:

$$P_3(x,y) = P_1(x,y) + P_2(x,y); \text{ for all } x,y$$

or $$P_3(x,y) = \frac{P_1(x,y) + P_2(x,y)}{2} ; \text{ for all } x,y$$

The first of these equations is a simple summation, and will effectively give an increase in the overall intensity. The second of these equations represents an averaging effect.

The overall effect of this technique is to add highlights to an image. The values selected for INTENSITY$_1$ and INTENSITY$_2$ set the highlight brightness and extent.

An alternative way of considering FIG. 5 would be to provide two variable gain units in the two branches, and then a simple summation unit at 58. If the gains of the two units are set equal to one another and some arbitrary constant, then the two branches are effectively added, as well as being multiplied by the arbitrary constant. If the two gains are set equal and equal to one-half, then one effectively obtains an average of the two branches. Thus, by providing two gain units one obtains a more general combination of the original image and the contrast stretched image.

With regard to preferred operating parameters for this FIG. 5 embodiment, for a well exposed video resolution image, INTENSITY$_2$ and INTENSITY$_1$ could be chosen as the sixtieth percentile grey level in the input image and the ninety-fifth percentile grey level in the input image respectively. This percentile selection adds robustness to a varying lighting condition. This effectively adds or averages the pixel intensities between the sixtieth and ninety-fifth intensity percentiles to the input image. This range of intensities between these two percentiles is deemed to be the highlights of the input image.

If the highlights are averaged with the input image, the highlights are incorporated into the image in the locations that they are present in the original input image; however, in areas of image where there are no highlights present, the addition of highlights has no effect. Where the averaging technique is used, the areas with highlights are still highlighted, but to a slightly lesser extent, whereas the areas with no highlights are effectively decreased in intensity. This has the effect of making the highlights more pronounced. Averaging the highlights into the image makes the output image appear as if the highlights were added using chalk.

Figure 6:
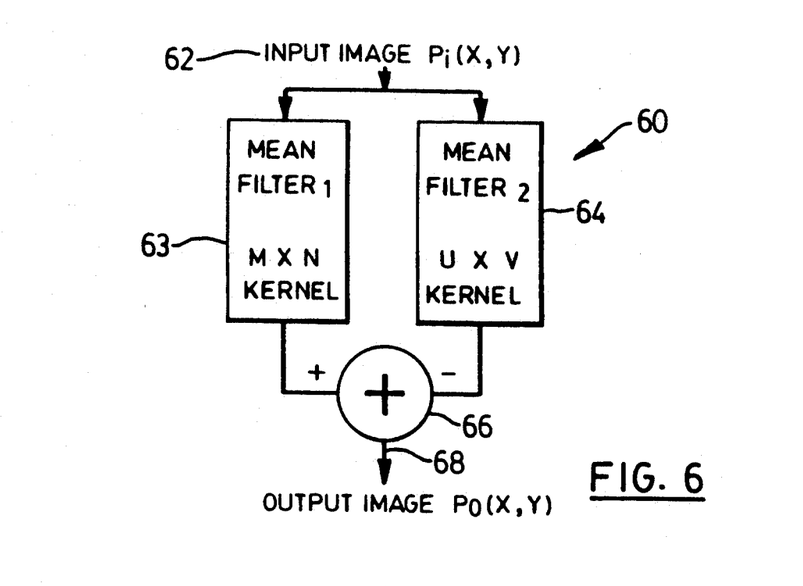

Referring to FIG. 6, there is shown an apparatus, intended to transform an input image into a line drawing. The apparatus, here denoted 60, has an input 62 connected to first and second mean filters 63, 64. The output of the mean filters are connected to positive and negative inputs of a summation unit 66, which has an output 68 forming the output of the apparatus. Here, the first mean filter 63 has a kernel m×n, whilst the second mean filter has a kernel u×v. The kernel of the first mean filter 63 is greater than that of the second mean filter 64; in other words, m is greater than u and n is greater than v.

The output at 68 is given by the following equation:

$$Po(x,y) = \frac{\sum_{i=-m/2}^{m/2} \sum_{j=-n/2}^{n/2} Pi(x-i, y-j)}{mn}$$

$$- \frac{\sum_{k=-u/2}^{u/2} \sum_{l=-v/2}^{v/2} Pi(x-k, y-l)}{uv} \; ; \text{for all } x,y$$

The effect of this arrangement is, for each pixel, to first take a mean within a first kernel of all the pixels in that kernel, and then subtract a mean signal derived from the second, smaller kernel, to arrive at an output signal.

Each mean filter 63, 64, performs a low-pass function. The cut-off frequency of each mean filter is determined by the size of the kernel, so that the filter with a smaller kernel has a higher cut off frequency. By subtracting the output of one filter from the other, one obtains a band-pass filter. Normally, edge information occupies the higher frequency regions of an image, i.e. sharp transitions. However, image noise also tends to reside at the higher frequencies. Thus, if one uses a band-pass filter, one can pass some of the high frequencies through to extract the image edges for forming a line drawing, but simultaneously attenuate the highest frequencies that contain noise and make for a dirtier or noisier line drawing image.

Here, it will be appreciated that, because of the relative sizes of the two kernels, one is in fact subtracting the output from the mean filter with the higher cut-off frequency, namely filter 64 from the output of the other mean filter with the lower cut-off frequency, namely, filter 63. In effect, this gives a negative band pass filter operation.

The result is that the small features in an image, normally associated with higher frequencies, such as a human tooth or iris of the pupil are outlined; a conventional band-pass filter would cause them to appear to be filled in. Here, it is to be noted that if the negative band-pass filter gives an output indicating a negative value for the intensity then this is treated as zero.

It has been found that useful ranges for the sizes of the two kernels are the range 1-13 for the parameters u, v and the range 3-15 for the parameters m, n. The more particularly preferred values are for u and v to be both equal to 7 and m and n to be both equal to 11.

Figure 7:
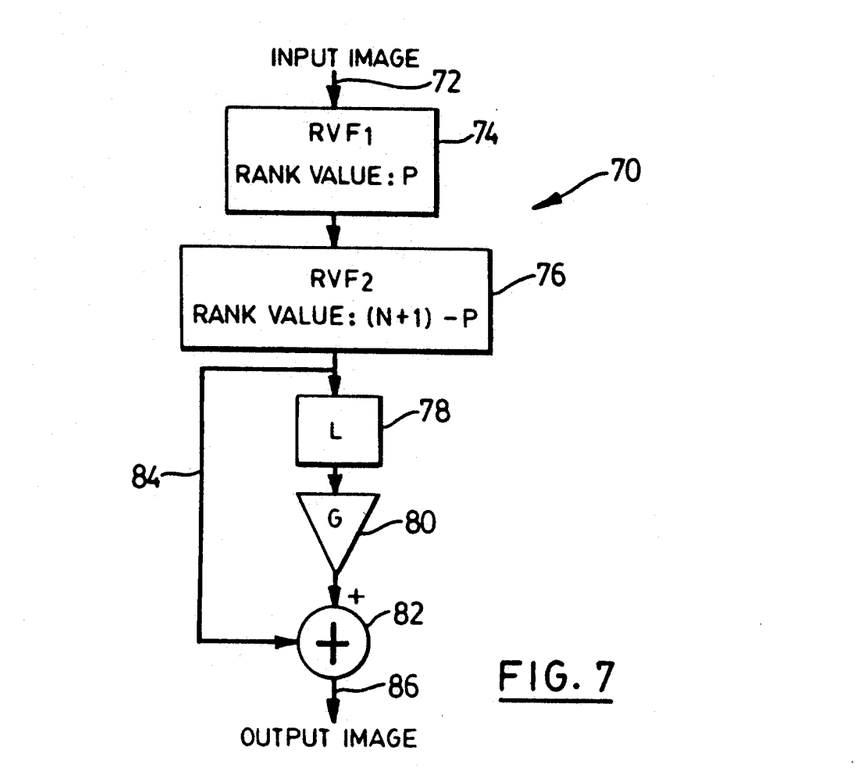

FIG. 7 shows an apparatus for modifying an image so that it appears to be painted in a water colour style. In particular, rounded blobby features reminiscent of, or simulating, paint dabs are added to the image.

The apparatus 70 of FIG. 7 has an input 72 connected to an input of a first rank value filter 74, which in turn has an output connected to a second rank value filter 76.

The output of the second rank value filter 76 is connected, as in the first arrangement of FIG. 1, through a Laplacian unit 78 and a gain unit 80 to a summation unit 82. There is also a bypass line 84 providing a direct connection from the output of the filter 76 to the summation unit 82. The summation unit 82 sums its two inputs and forms an output 86.

The two rank value filters 74, 76 have identical kernel size and shape, but the rank value for each filter is chosen differently, in accordance with the following method.

Let a rank value of 1 with respect to a kernel correspond to the minimum pixel value in the kernel and a rank value of N correspond to the maximum pixel values in the kernel. Choose a value of p such that:

$$1 \leq p \leq N$$

Then the rank for the filters 74, 76 are selected as:
RVF Filter 74: p
RVF Filter 76: (N+1)−p Thus in effect, p is chosen arbitrarily and the sum of the two ranks for the two rank value filters is equal to the sum of the maximum and minimum rank value in the kernel. When p is halfway between one and N, then the rank for each filter will be similar. The bright areas of the image do not then move relative to the dark areas of the image. However, as p is decreased toward one, then the first rank value filter will have the low rank p, whilst the second rank value filter 76 will have a relatively high rank. This has the effect of the dark areas of the image expanding more into the light regions. Correspondingly, as p is increased towards N, the light regions of the image expand more into the dark regions.

The combination of the two rank value filters produces the rounded blobby areas. The units 78-84 accentuates the paint dabs. A low gain, e.g. close to zero, produces a muted blob, whilst a higher gain produces a stronger dab. It is to be noted that components 78-84 correspond to the arrangement shown in FIG. 1.

It is to be noted that if p=1, then the first rank value filter 74 is a local minimum filter or morphological erosion operator, i.e. it causes bright areas of the image to contract and dark areas to expand, and the second rank value filter 76 is then a local maximum filter or dilation operator, i.e. bright areas of the image expand while dark areas contract. The combination of the two filters operating as erosion and dilation operators performs an operation referred to as a morphological opening. The net effect of an opening is that local peaks in the image smaller than the kernel extent are smoothed from the image and the dark areas of the image seep into the bright areas, since the dilation does not quite counter-act the initial erosion. The combination of this local peak smoothing and dark regions swelling produces round blobby areas in the image reminiscent of water colour paint dabs.

Correspondingly, if p=N, the roles of the two rank value filters are reversed. The first rank value filter 74 becomes a maximum filter, whilst the second rank value filter 76 becomes a local minimum filter. The combination of the two filters working in series then performs a morphological closing. The net effect of such a closing is the local valleys in the image, i.e. dark areas which are smaller than the kernel extent, are filled in and the bright areas of the image seep into the dark areas. Here, the erosion does not quite counteract the initial dilation. Again, in the combination of valley filling and light region swelling produces blobby areas reminiscent of water colour dabs.

If p is adjusted to be in the mid-point between 1 and N, there is less movement of the dark regions into the light and vice versa. As well, the overall effect of the blob area creation diminishes as p approaches the mid-point, since full erosions and dilations are no longer being performed. The two rank value filters become median filters that preserve intensity boundary locations, thus when p is located in the mid-point of the range, the water colour effect becomes more subtle.

The role of the Laplacian filter 78 and gain unit 80 is to strengthen the paint dab boundaries. The higher the gain the more pronounced the boundary.

The preferred parameters for this method are:
p=20
N=25
G=1.0
However, useful ranges for these parameters are:
$1 \leq p \leq N/5$
or $(N-N/5) \leq p \leq N$
N in the range 9-121
G in the range 0-3

Figure 8:
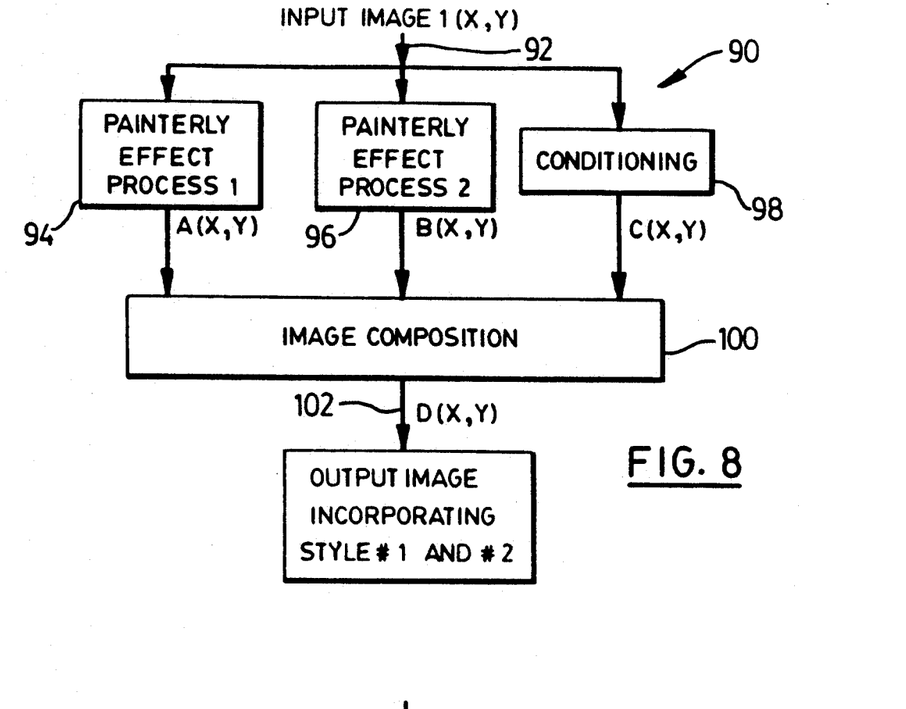
FIG. 8 shows an apparatus for combining different effects together.

Turning to FIG. 8, there is shown a method and apparatus for combining different effects together. Here, the apparatus 90 has an input 92 connected to first and second processes indicated at 94, 96 and to a conditioning unit 78. The outputs of these three units 94, 96 and 98 are connected to an image composition unit 80 which produces an output 102.

The processes 94, 96 can be any one of the processes in accordance with the present invention, e.g. those described in relation to the preceding figures. This apparatus enables them to be combined in a variety of ways. The conditioning unit 98 provides a switching function to combine the two modified images produced from the processes 94, 96 as desired.

The conditioning unit 98 can produce the following function at the output 102:

$$D(x,y) = \frac{C(x,y)A(x,y)) + (MAX\text{-}VAL - C(x,y)B(x,y)}{MAX\ VAL}$$

Where:
MAX VAL is the maximum allowable pixel intensity value.

In effect, this function provides that the respective weights given to the two processes A, B, depends upon the intensity of the conditioning signal, C, for that particular pixel.

It is expected that useful conditioning functions for the conditioning unit 98 are: no conditioning performed; edge magnitude detection; and contrast stretching. Other conditioning techniques are possible. Thus, one can detect different areas of an image in relation to colour and/or intensity or other factors. Then, these different areas can be subjected to different processes. Also, whilst just two processes 94, 96 are shown, it will be realized that this basic arrangement can be generalized to any number of processes.

Another possibility is to combine images dependent upon the brightness, i.e. in the bright areas one processing technique is used, whereas in the dark areas another technique is used. In this case, the input image itself may serve as the switching function. However, one may wish to condition the input image in some way to change the reaction of the switching function. For instance, an edge magnitude detector could be employed to create image C. This has the effect of having image A dominate the output image and areas of high edge intensity and image B in regions of low edge intensity. Alternatively, the input image could have its intensity profile modified in some way such as a contrast stretch in order to modify the switching function.

Figure 9:
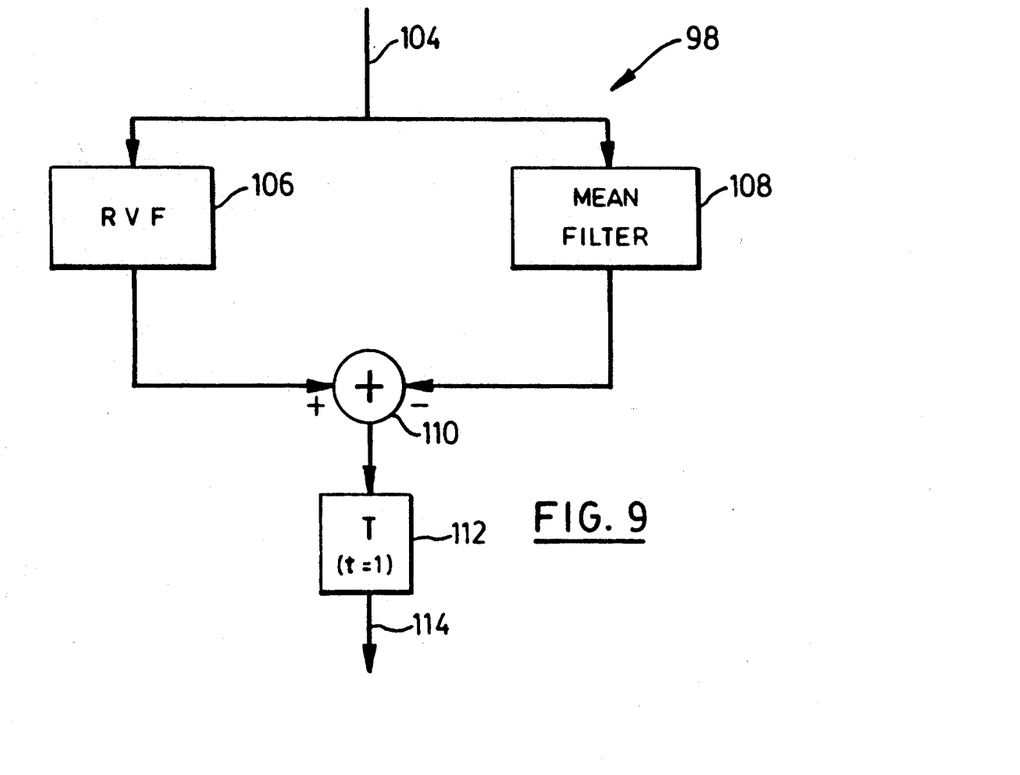
FIG. 9 shows an apparatus for carrying out the conditioning process in FIG. 8.

Referring now to FIG. 9, there is shown an example of one conditioning process that could be used. Here, the conditioning unit 98 has an input 104 which is connected to the inputs of a rank value filter 106 and a mean filter 108. The outputs of these two filters 106, 108 are connected to a combination unit 110 which has positive and negative inputs for the two filters, 106, 108 respectively. The output of the unit 110 is connected to the threshold unit 112, and in turn to an output 114.

The rank value filter 106 has a rank value of 25, i.e. a median value. The thresholding unit 112 provides thresholding process where every pixel intensity greater than the threshold t is mapped to MAX VAL. Any pixel having an intensity less than t is mapped to zero. Here, t is set equal to 1.

With this conditioning process, the output of 114 will be set equal to MAX VAL, where the local median value is greater than or equal to the local mean value. On the other hand, where the median value is less than the mean value, the output 114 will be zero.

Using the equation for the output D(x,y), for FIG. 8, then the output will be process 1, where the local median value is greater than or equal to the local mean value. On the other hand, where the median value is less than the mean value, then process 2 will be passed through to the output.

The effect of this switching function is to produce a strong painted effect.

The two filters 106, 108 preferably have a kernel size of 7×7.

Figure 10:
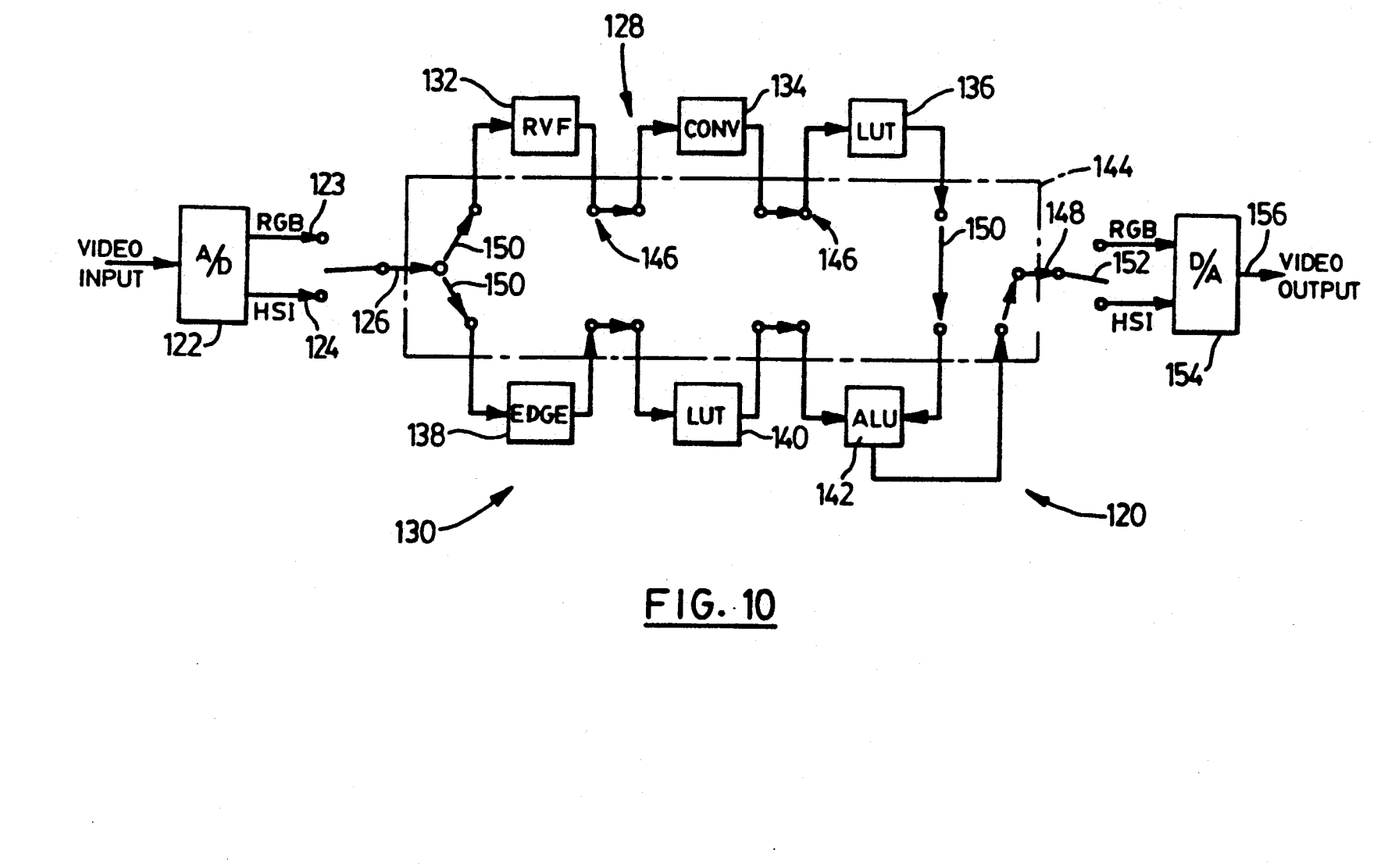
FIG. 10 shows a schematic diagram of an apparatus capable of carrying out a number of different methods.

Reference will now be made to FIG. 10, which shows a block diagram for a real-time digital video effect process, indicated by the reference 120. The process of 120 has an analog to digital converter 122 with an input for a video signal. This produces two outputs, 123, 124 for the RGB and HSI colour spaces.

A switch 126 enables either or both of these outputs 123, 124 to be connected through to two separate branches 128 and 130.

In the first branch 128, there is an rank value filter 132, connected to a convolution filter 134, and then in turn to a lookup table 136.

In the second branch 130, there is an edge detection unit 138, another lookup table 140 and an arithmetic logic unit 142.

As indicated at 144 the various components 132–142 would be mounted in a common housing and connected, as indicated by terminals 146, to one or more digital crosspoint switches. These digital crosspoint switches would enable the components 132–142 to be connected in a variety of patterns. The input switch 126 and output 148 are similarly provided with terminals 146 to enable them to be connected by the digital crosspoint switches.

In FIG. 10, arrows 150 indicate, schematically, the digital crosspoint switch or switches and their effective connections.

It will be appreciated that a variety of different functional units could be provided, as shown elsewhere in the drawings, and these could be combined in various ways. Such functional units include: variable gain units; Laplacian units; random number generators; constrast stretch units; and mean filters.

Thus, here the input signal passes through the first branch 128 where the signal is given a brush stroke effect by the rank value filter 132 and then sharpened in the convolution filter 138 prior to a contrast stretch operation by the lookup table 136. Simultaneously, in the other branch, the convolution filter 138 detects edges, and the magnitude of the edges and then normalized by the lookup table 140.

The arithmetical logic unit 142 subtracts the output of the two lookup tables 136, 140, so as to subtract the normalized edges from the image from the first branch 128. The edges in the resulting image will now have dark outline highlights.

The output 148 is then connected by a switch 152 to the RGB or HSI input of a digital to analog converter 154, and then to a final output 156.

We claim:

1. A system for incorporating two or more effects into an input digitized signal of an image, the system comprising: a conditioning unit for generating a conditioning signal, and at least two selected apparatus, each for providing a different effect, the input digitized signal being connected to the input of the conditioning unit and the inputs of the selected apparatus; and an image composition unit having inputs connected to the outputs of the selected apparatus and an output of the conditioning unit, the image composition unit composing an output image by selective combination of the outputs of the selected apparatus as determined by the conditioning signal;

wherein the selected apparatus are selected from the group comprising:

(a) a first apparatus for adding an airbrush effect to a digitized signal of an image, the apparatus comprising means for generating, for each pixel, first and second random numbers corresponding to the first and second coordinates for that pixel, and summation means for adding, for each pixel, the two corresponding random numbers to the two corresponding coordinates respectively, to produce output coordinates, whereby the pixels of the original image are scattered randomly in the output image in dependence upon the random numbers generated;

(b) a second apparatus for transforming a digitized signal of an image to give a brush stroke effect, the apparatus comprising a main input, a first rank value filter having an input for an original digitized signal, connected to the main input of the apparatus, a Laplacian unit having an input connected to an output of the rank value filter and an output, a gain unit with variable gain and connected to the output of the Laplacian unit, a summation unit having one input connected to an output of the gain unit and an output forming an output of the apparatus, and a bypass line connected between the output of the first rank value filter and another input of the summation unit; and (c) a third apparatus, for transforming an input digitized signal of an image comprising a plurality of pixels to give the appearance of a reflective surface, the apparatus comprising: an input for an original digitized signal of an input image; an input for a reflected digitized signal of an image to be reflected in the input image; means for generating smoothness constants for the two coordinates of the pixels representative of the surface smoothness; means for generating image extent constants representative of the image extent of the pixels in the two coordinate directions; means for checking, for each coordinate of each pixel, whether a first intensity, being the intensity of the respective pixel of the input image, is the same as the second intensity of another pixel of the input image spaced along the respective coordinate by the respective coordinate smoothness constant; setting means for setting, for each coordinate of each pixel, the respective coordinate equal to the coordinate of the input image when said checking means determines that the first and second intensities are the same, and otherwise, for setting the coordinate equal to the coordinate image extent constant divided by $\pi$ and multiplied by the arc tangent of the respective coordinate smoothness constant divided by the difference between the first intensity minus the second intensity; and means for determining, for each pixel, the intensity in a transformed output image by taking the intensity of a corresponding pixel in the reflected digitized signal determined by the coordinates set by said setting means.

2. A method for incorporating two or more effects into a digitized signal, the method comprising at least two methods, each for providing a different, selected effect, and carrying out the following additional steps:
  (i) generating a conditioning signal from the input signal;
  (ii) composing an output signal by selection from the outputs of the selected methods, in dependence upon the conditioning signal;
  wherein the methods are selected from the group comprising:
  (a) a method of adding an airbrush effect to a digitized signal of an image, which comprises, in the following order, the following steps:
    (i) for each pixel generating first and second random numbers corresponding to the first and second coordinates for that pixel;
    (ii) for each coordinate of each pixel, adding the respective random number to that coordinate to produce an output coordinate, whereby the pixels of the original image are scattered randomly in an output image in dependence upon the random numbers generated;
  (b) a method of transforming a digitized signal of an image to give a brush stroke effect, which method comprises, in the following order, the following steps:
    passing the signal through a rank value filter to filter the intensities of the pixels, to produce a rank value filtered signal;
    passing the signal through a Laplacian unit and subsequently applying a preset gain to the signal; and
    adding the rank value filtered signal from step one to the signal produced by step two to produce an output signal; and
  (c) a method for transforming an input digitized signal of an input image to give the appearance of a reflective surface, which method comprises, in the following order, the following steps:
    (i) generating smoothness constants for the two coordinates of each pixel representative of the surface smoothness;
    (ii) generating image extent constants representative of the image extent of the pixels in the two coordinate directions;
    (iii) providing a reflected digitized signal of an image to be reflected in the surface of the input image;
    (iv) for each coordinate of each pixel, checking whether a first intensity, which is the intensity of the respective pixel in the input image, is the same as the second intensity of another pixel of the input image spaced along the respective coordinate by the respective coordinate smoothness constant;
    (v) for each coordinate of each pixel, setting the coordinate equal to the coordinate of the input image when step (iv) determines that the first and second intensities are the same, and otherwise setting the coordinate of each pixel equal to the respective coordinate image extent constant divided by $\pi$ and multiplied by the arc tangent of the respective coordinate smoothness constant divided by the difference between the first intensity minus the second intensity,
    (vi) determining, for each pixel, the intensity in a transformed output image by taking the intensity of a corresponding pixel in the reflected digitized signal determined by the coordinates calculated in steps (iv) and (v).

3. A system as claimed in claim 1, wherein each smoothness constant is one.

4. A method as claimed in claim 2, wherein each smoothness constant is one.

* * * * *